United States Patent [19]

Lockett et al.

[11] Patent Number: 4,644,750

[45] Date of Patent: Feb. 24, 1987

[54] HEAT RECOVERY SYSTEMS

[75] Inventors: George E. Lockett; Robert D. Thurston, both of Skelmersdale, England

[73] Assignee: Energy Soft Computer Systems Limited, Lancashire, England

[21] Appl. No.: 829,148

[22] PCT Filed: Jun. 14, 1985

[86] PCT No.: PCT/GB85/00267

§ 371 Date: Feb. 4, 1986

§ 102(e) Date: Feb. 4, 1986

[87] PCT Pub. No.: WO86/00124

PCT Pub. Date: Jan. 3, 1986

[30] Foreign Application Priority Data

Jun. 14, 1984 [GB] United Kingdom ............... 84 15116

[51] Int. Cl.⁴ ............................................... F03G 7/04
[52] U.S. Cl. ..................... 60/641.2; 165/45; 165/104.25; 165/104.26
[58] Field of Search ................ 165/45, 104.26, 104.25; 60/641.2

[56] References Cited

U.S. PATENT DOCUMENTS

| 3,844,342 | 10/1974 | Eninger et al. | 165/104.26 |
| 3,857,244 | 12/1974 | Faucette | 60/641.2 |
| 3,913,665 | 10/1975 | Franklin et al. | 165/104.26 |
| 4,094,356 | 6/1978 | Ash et al. | 60/641.2 |
| 4,290,266 | 9/1981 | Twite et al. | 60/641.2 |
| 4,470,450 | 9/1984 | Bizzell et al. | 165/104.26 |

FOREIGN PATENT DOCUMENTS

| 2458457 | 7/1975 | Fed. Rep. of Germany | 60/641.2 |
| 586378 | 3/1977 | Switzerland | 60/641.2 |

Primary Examiner—Albert W. Davis, Jr.
Attorney, Agent, or Firm—Nixon & Vanderhye

[57] ABSTRACT

Geothermal energy is recovered from an underground zone of relatively hot strata via a borehole into which is inserted a heat pipe system containing a working fluid, the heat pipe system comprising an assembly of two tubes in concentric relation, the inner tube being constituted by a relatively small diameter capillary for the return of working fluid to the vicinity of the zone of the relatively hot strata. The working fluid is preferably assisted in its return under gravity by means of a pump. The system includes heat exchange means operable to recover thermal energy from the working fluid. A third and outermost tube may be used to reduce heat losses, this third tube enclosing the two tubes over all but that part of their length which is in the zone of relatively hot strata.

6 Claims, 1 Drawing Figure

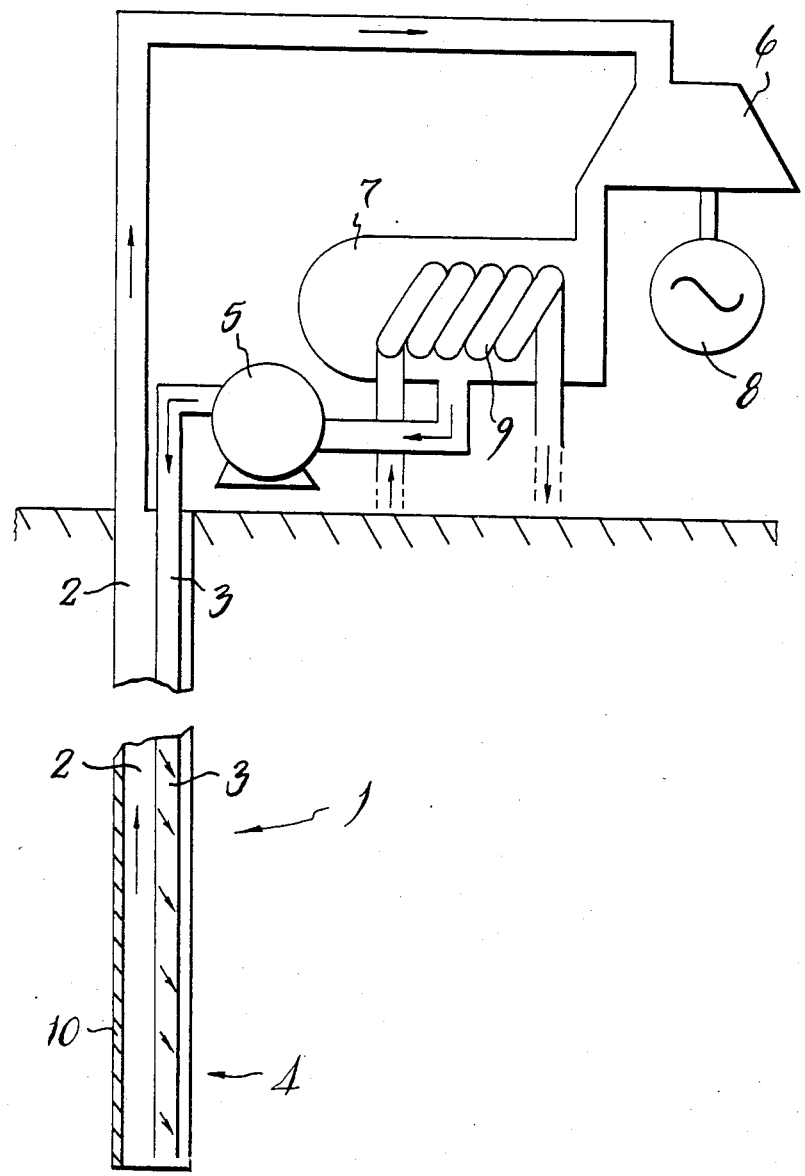

4,644,750

HEAT RECOVERY SYSTEMS

FIELD OF THE INVENTION

This invention relates to the recovery of geothermal energy. It is well-known that very hot strata can be found at relatively small depths below the surface of the earth. Volcanic phenomena are the most obvious example, although perhaps the least amenable to exploitation. Hot springs are exploited of course, but they are rare.

TECHNICAL BACKGROUND

It has been proposed to create a form of hot spring by pumping water through hot strata fractured by drilling and explosive blasting. Whilst this certainly works, it is not very efficient due to the need to have two spaced-apart bore holes, one to supply relatively cold water and the other to recover it after passage through the hot strata. Also it is necessary to use considerable energy in circulating the water, not just through the strata, but also through the great lengths of pipe needed to reach the latter.

It has been proposed that these problems can be at least mitigated by using a single bore hole provided with two tubes assembled in concentric relation, with one tube being used to supply cold water and the other used to recover it. This certainly avoids the need to drill a second bore hole, but it creates an even bigger problem due to the absolute necessity to have a very efficient heat exchanger at the bottom of the bore hole, since the heat must now be recovered from that relatively limited portion of the hot strata in the immediate vicinity of the bottom of the tube assembly. Where, for example, water is circulated through the latter using the single bore hole system the overall efficiency is quite low.

There is still the problem of the energy needed to circulate the water.

DISCUSSION OF THE PRIOR ART

In order to overcome the above problems it has been proposed that geothermal heat should be recovered by means of a passive heat pipe. U.S. Pat. No. 3,911,683 proposes such a system based on a conventional heat pipe scaled up in dimensions, most particularly in length. Whilst the high thermal efficiency of heat pipes is well-established, the practical problems of such scaling have not been addressed. Unless high thermal efficiency can be retained in the scaled-up version, the resultant arrangement will at best show no advantage over prior systems. At worst, it will not work at all due to the losses involved at the extreme length-to-diameter ratios involved.

DISCUSSION OF THE INVENTION

According to the present invention, a method of recovering geothermal energy comprises the steps of inserting a closed tube into a bore hole extending from the surface into a zone of relatively hot strata so that one end of said tube is at or adjacent the surface and the other end is in said zone, providing heat exchange means in operative contact with said one end, before or after evacuating the closed tube and introducing a quantity of a working fluid thereinto, followed by operating said heat exchange means to recover energy from said working fluid, characterised by the step of providing said tube in the form of an assembly of two tubes disposed in concentric relation, the inner tube being constituted by a relatively small diameter capillary for the return of working fluid to the vicinity of the zone of relatively hot strata.

PREFERRED FEATURES OF THE INVENTION

The method preferably includes the step of providing means such as a pump operable to positively assist the return of the working fluid under gravity. A third and outermost tube is advantageously provided to surround the two tubes in spaced relation thereto, as a means of reducing conduction losses into the cooler strata above the relatively hot strata. Where three tubes are used, the method preferably includes the steps of inserting the third tube into the bore hole first, followed by inserting into it the other two tubes which together constitute the closed tube itself, this second insertion step being carried out so that the closed tube projects from the bottom, downhole end of the third tube into the zone of relatively hot strata. The method then preferably also includes the step of sealing the otherwise open end of the third tube around the closed tube where it emerges into the zone. For example, this may be done by injecting a grouting compound or cement down the third tube.

In order to improve the heat absorption properties of the closed tube, it is preferably provided with a thermally-efficient region in the vicinity of its lower, or downhole end, in the zone of relatively hot strata. Thus it may be provided with an internal wick of sintered copper, porous to the working fluid and its vapour, and extending over, say, the whole of the lowermost kilometer of the closed tube. To further improve the heat transfer to the working fluid, the method may include a preliminary step of fracturing the relatively hot strata towards the bottom of the bore hole, followed by the introduction of a fluid such as water, before inserting the closed tube.

Whilst the method may also include the further step of actually drilling the bore hole, this will not always be an essential feature, since an important aspect of the invention lies in the fact that the method can utilise an existing bore hole such as an exploratory drilling intended to seek oil, gas or some other natural resource. This ability to utilise an otherwise useless bore hole is extremely important, since there are very many more exploratory bore holes than there are successful oil or gas wells. Provided the geothermal characteristics are satisfactory, and the bore is of a suitable diameter—which most are—a dry oil/gas well can be used as a source of energy.

The heat exchange means may be of any appropriate kind. The recovered heat can be used simply as heat, or it can be used to produce electricity and/or hot water. The working fluid may be water, or one of the specialised fluids used for heat pipe applications. These include "FREON", "ARCTON", "THERMEX", (Trade Marks), ethanol, methanol, ammonia, "THERMIA oil B" and "TRISS" (Trade Marks.)

Selection will depend on expected operating temperatures/pressures, energy throughput, size of plant and the like.

It will be appreciated that because the closed tube is evacuated before introducing the working fluid, the tube operates as a heat pipe rather than as a simple duct through which the fluid is to be circulated by a pump. The use of a capillary return pipe for the working fluid is essential to this; it overcomes the problems inherent in simply scaling up a conventional heat pipe incorporating a wick, such as is described in the US patent referred to earlier.

Without this feature the system rapidly reaches an unstable equilibrium state, intermediate the hot strata and the surface, with the rising hot vapour impeding the proper return flow of condensed liquid/cool vapour to the bottom of the closed tube. This follows from the fact that the scaling up needed to reach the bottom of a bore hole inevitably and enormously increases the length-to-diameter ratio of the assembly as compared to known, conventional heat pipes. The heat input to the bottom of the closed tube causes some of the working fluid to vaporise and create a pressure in the tube. The heated vapour rises very rapidly because the tube was previously evacuated; the rate of heat transfer to the surface end of the tube is high by comparison with all other systems. This means that the thermal efficiency is also high, because the vapour has less time to cool. Also, it is separated from direct contact with the returning fluid in the capillary. Where a third tube is used as an outer casing, the losses are naturally lower still.

TYPICAL SYSTEM PARAMETERS

In a typical geothermal energy recovery system using the method of the invention, a single 15 to 30 cm diameter bore hole can be used, with a closed tube say 10 to 20 cm in diameter. In such a system the inner capillary for the return of the working fluid to the bottom of the closed tube may be 3 to 5 cm in diameter. It will be appreciated that the depth of the bore hole is not readily definable; it may be well in excess of 1000 meters, depending on the geology of the site. Depths of over 4 to 5000 meters can be considered normal if the temperature of the hot strata is to be high enough to make the method cost-effective. This of course highlights the effects of scaling referred to above; the problem is not as simple as the prior art suggests.

The closed tube preferably projects at least 200 meters from the end of any third tube used, to reduce heat losses. The latter tube may be provided with a series of insulating and/or centering spacers for the closed tube, so as to reduce the risk of losses by direct conduction between the tubes. In the case of the closed tube, the joints between individual pipes forming the string are preferably welded to ensure that the finished tube can be successfully evacuated. Screw-threaded couplings are unlikely to have the necessary sealing performance, of course.

BRIEF DESCRIPTION OF A PREFERRED EMBODIMENT

In order that the invention be better understood a preferred embodiment of it will now be described with reference to the accompanying drawing, in which the sole FIGURE is a schematic representation of an energy recovery system in accordance with the invention.

Referring to the FIGURE, the installation may be conveniently described in terms of two portions, one above ground level and the other below it. The below ground level portion comprises most of the closed tube assembly, designated (1). This consists of an outer tube (2) inside which is an inner tube (3).

The latter constitutes the capillary which was referred to earlier and accordingly, it stops short of the bottom of the surrounding tube (2), the bottom end of which is sealed. For present purposes it will be assumed that the bottom part (4) of the assembly is located in a region of high thermal energy. That is, the lowermost part of the closed tube (typically up to half a kilometer long) is surrounded by hot strata, suffused by hot water and/or steam. The capillary return is preferably provided with numerous small holes (indicated by arrows) to facilitate even distribution of the working fluid throughout the zone 4.

It will be appreciated that the closed tube will inevitably be considerably longer than can be shown in a drawing such as this, perhaps as much as five kilometers or more. Preferably the lowermost half kilometer or so of the closed tube has a high conductivity cladding to enhance the transfer of energy through the tube wall. This cladding may also serve to protect the outer surface of the tube against corrosion; in some environments this may be an important point, since frequent maintenance will normally be impracticable. The inner surface of the tube (2) is preferably provided with a sintered metal wick as a lining (10). This will serve to improve the thermal transfer to the working fluid.

Copper and stainless steel are examples of materials which may be used for this purpose.

The above-ground part of the installation comprises a Rankine cycle heat exchange/recovery unit, with the addition of a pump (5). The working fluid, now in vapour phase, arrives at the surface and is dumped into an expansion chamber (6) from which it passes into a condenser section (7).

The expansion chamber (6) forms part of a turbine (8) and thus the vapour is used to produce electricity directly. It will be appreciated that the expansion chamber may instead be of the kind incorporating a a heat exchanger which is used to generate steam; this may then be passed through a turbine/alternator (8) to produce electricity, by an indirect system. The coil (9) of the condenser is supplied with cooling water, (which may incidentally be used to extract residual heat energy from the working fluid) prior to passing the spent working fluid to the pump (5). The pump feeds fluid to the top end of the capillary tube (3) and assists the fluid to return downhole under gravity, for continued operation of the system as a heat pipe.

It will be appreciated that the closed tube assembly (2, 3) must be at least partially evacuated prior to introducing the working fluid, or it will not function as a heat pipe. It will also be appreciated that the closed tube must be assembled at the surface and progressively lowered into place, using the methods commonly used in oil well construction, but taking extra care to ensure tight joints between individual sections of the pipe string. As mentioned earlier, an outer supporting casing (not shown) may be installed first and used to reduce heat loss from the closed tube assembly.

However, such an outer tube will of course not extend all the way down to the bottom of the closed tube. In other words it will not enclose the bottom half kilometer or so which is in intimate contact with the hot strata. Insulating spacers are preferably used to keep the outer casing or tube away from the closed tube. The bottom of the outer tube is preferably sealed, also to minimise losses.

What is claimed is:

1. A method of recovering geothermal energy comprising the steps of inserting a closed tube in the form of an assembly of two tubes disposed in concentric relation, the inner tube being constituted by a relatively small diameter capillary for the return of a working fluid, into a bore hole extending from the surface into a zone of relatively hot strata, so that one end of said closed tube is at or adjacent the surface and the other end is in said zone, providing heat exchange means in operative contact with said one end, followed by operating said heat exchange means to recover energy from said working fluid, characterised by the preliminary step of at least partially evacuating the closed tube prior to introducing a quantity of working fluid thereinto.

2. The method of claim 1, further characterised by the step of providing numerous small holes in the lowermost part of the capillary return to facilitate even distribution of the working fluid throughout the bottom part of said assembly, adjacent said other end in said zone.

3. The method of claim 2 characterised by the step of providing the inner surface of said lowermost part of the closed tube with a sintered metal lining to improve the thermal transfer to the working fluid returned through said small holes.

4. The method of claim 3, characterised in that the lining is provided in the form of a sintered copper wick.

5. The method of claim 1, characterised by the step of providing that portion of the closed tube in intimate contact with the zone of relatively hot strata with an outer cladding of a high thermal conductivity material, optionally also serving to protect said portion against corrosion in said zone.

6. The method of claim 1, characterised by the use of a Rankine cycle heat exchanger as the heat exchange means, whereby energy is recovered directly from the closed tube system.

* * * * *